United States Patent [19]

Rowland-Hill

[11] 4,412,549

[45] Nov. 1, 1983

[54] COMBINE HARVESTER WITH IMPROVED CLEANING

[75] Inventor: E. William Rowland-Hill, Lancaster, Pa.

[73] Assignee: Sperry Corporation, New Holland, Pa.

[21] Appl. No.: 316,253

[22] Filed: Oct. 29, 1981

[51] Int. Cl.³ .............................................. A01F 12/48
[52] U.S. Cl. .................. 130/27 T; 130/27 Z
[58] Field of Search ................. 130/27 T, 27 Z, 27 R, 130/27 AE; 56/14.6

[56] References Cited

U.S. PATENT DOCUMENTS

| 3,509,885 | 5/1970 | Louks et al. | 130/27 R |
| 3,555,790 | 1/1971 | Quick | 130/27 R |
| 3,608,558 | 9/1971 | Sietmann | 130/27 AE |
| 4,208,858 | 6/1980 | Rowland-Hill | 130/27 T |
| 4,250,897 | 2/1981 | Glaser | 130/27 T |
| 4,265,077 | 5/1981 | Peters | 130/27 T |
| 4,284,086 | 8/1981 | Williams | 130/27 T |

FOREIGN PATENT DOCUMENTS 741822  6/1980  U.S.S.R. ............. 130/27 Z

Primary Examiner—Jay N. Eskovitz
Attorney, Agent, or Firm—Larry W. Miller; Darrell F. Marquette; Frank A. Seemar

[57] ABSTRACT

In a combine harvester of the type having a fan for removing chaff and the like from crop material moving from a grain pan through a plurality of sieves, an additional fan is provided for improved removal of chaff and the like as the crop material moves from rotary threshing and separating members to the grain pan.

6 Claims, 4 Drawing Figures

COMBINE HARVESTER WITH IMPROVED CLEANING

BACKGROUND OF THE INVENTION

This invention relates generally to threshing and, more particularly, to longitudinal threshing and separating cylinder machines.

In conventional combine harvesters crop material is threshed and separated until chaff and the like is removed and substantially clean grain remains. A fan is often used to blow a stream of forced air first through the sieves and then through the crop material moving from a grain pan or other such transport device. The air aids in removing undesirable chaff and the like from desirable grain.

A limitation of this is that a substantial amount of chaff passes to the grain pan after initial threshing and/or separating. This forms a conglomerate mass of grain and chaff which is difficult to clean. Thus, chaff acts to clog the ability for crop material to pass from the grain pan to the cleaning sieves.

The foregoing illustrates limitations of the known prior art. Thus, it is apparent that it would be advantageous to provide an alternative directed to overcoming one or more of the limitations as set forth above. Accordingly, a suitable alternative is to provide an additional fan for cleaning the crop material before that crop material enters the grain pan.

SUMMARY OF THE INVENTION

In one aspect of the present invention, this is accomplished by providing a combine harvester with improved cleaning including a rotary member for threshing and separating grain from crop material. A grain pan is operably connected for receiving crop material from the rotary member. A fan is provided to force a substantially flat sheet of air between the rotary member and the grain pan for cleaning grain moving therebetween.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
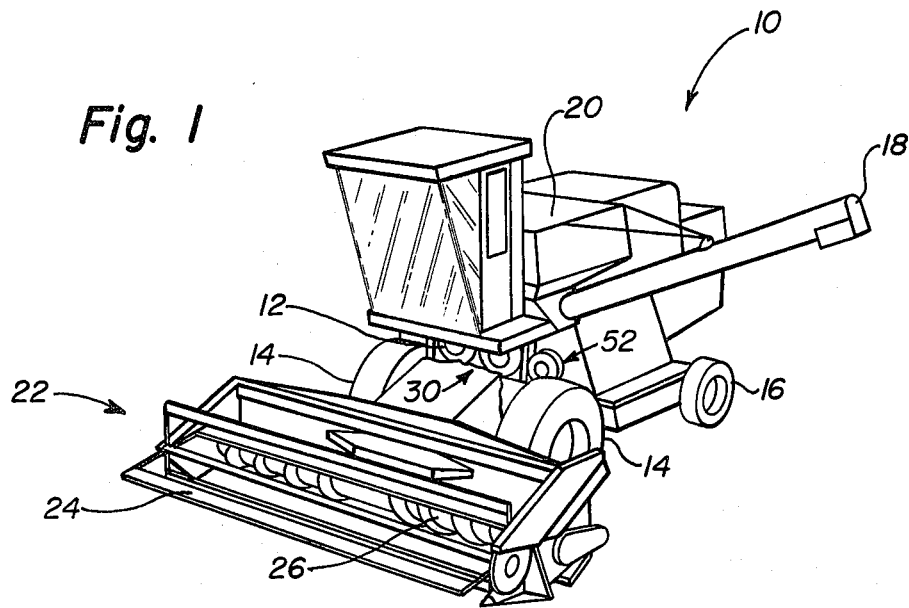
FIG. 1 is a perspective view illustrating an embodiment of an exemplary combine harvester.

An exemplary self-propelled combine harvester 10 is illustrated in FIG. 1. Harvester 10 is of the type having two rotors 12 each having an axis of rotation which extends generally in the direction of travel of harvester 10. A pair of front traction wheels 14 and a pair (only one shown) of rear steerable wheels 16 aid in providing mobility to harvester 10. An unloading auger 18 is used to discharge grain collected and then stored in a grain tank 20. A header 22 includes a reel 24 and a consolidating auger 26.

Figure 2:
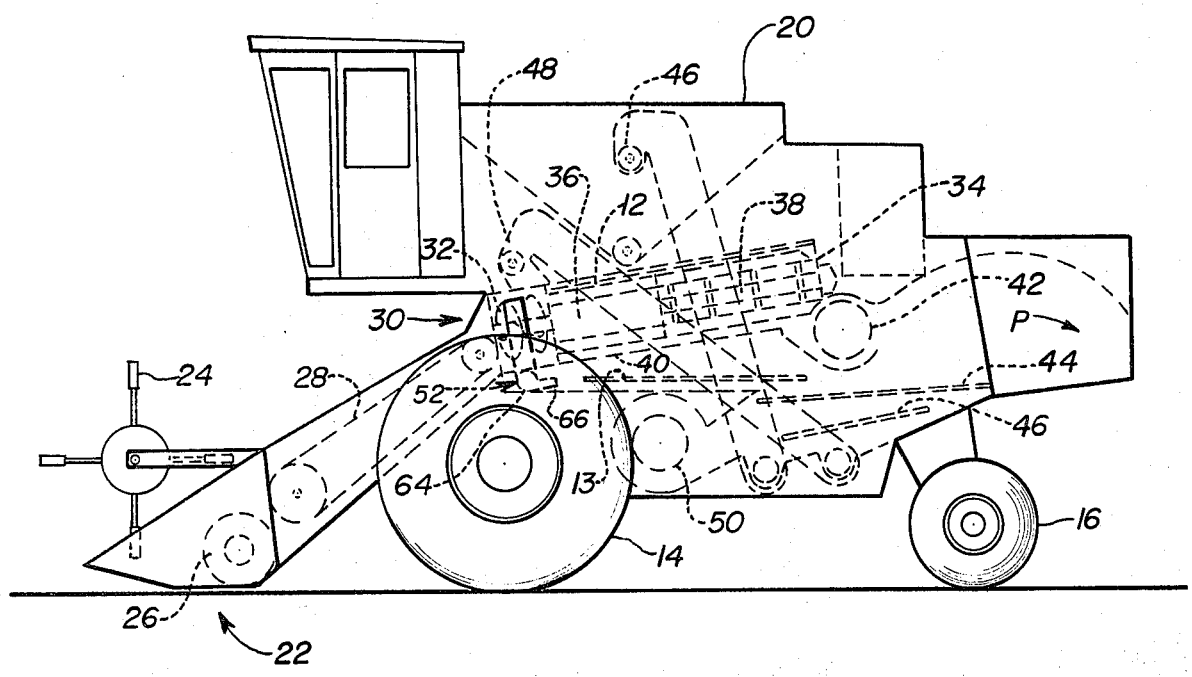
FIG. 2 is a cross-sectional side elevational view illustrating an embodiment of the present invention.

In FIG. 2, it is further illustrated that harvester 10 includes a crop elevator 28 for delivering crop material to an infeed portion 30 of rotors 12. Infeed portion 30 includes an infeed auger 32 which transports the crop material into a tube 34 wherein rotors 12 rotate. A threshing portion 36 of each rotor 12 is between auger 32 and a separating portion 38.

Grain which is threshed and separated by rotor 12 is driven through a grate portion 40 of tube 34 and onto a transport device such as a grain pan 13. In some instances, such transport devices include augers, as it is well known. A straw discharge means 42 is rotatably provided to discharge straw material, which emerges rearwardly from rotor 12, onto the ground in a direction generally indicated by an arrow designated P. Crop material from grain pan 13 drops to sieves 44,46. Crop material is transported via a grain elevator 46 to grain tank 20. In the case of unthreshed or incompletely threshed material (called tailings) a tailings elevator 48 moves such tailings to the infeed portion 30. A conventional fan 50 forces a stream of air through crop material traveling from grain pan 13 to sieves 44,46. Fan 50 is thus able to remove undesirable crop material, e.g., chaff, etc. from the desirable crop material, e.g. grain. Fan 50 thus functions to aid in cleaning the grain.

Figure 3:
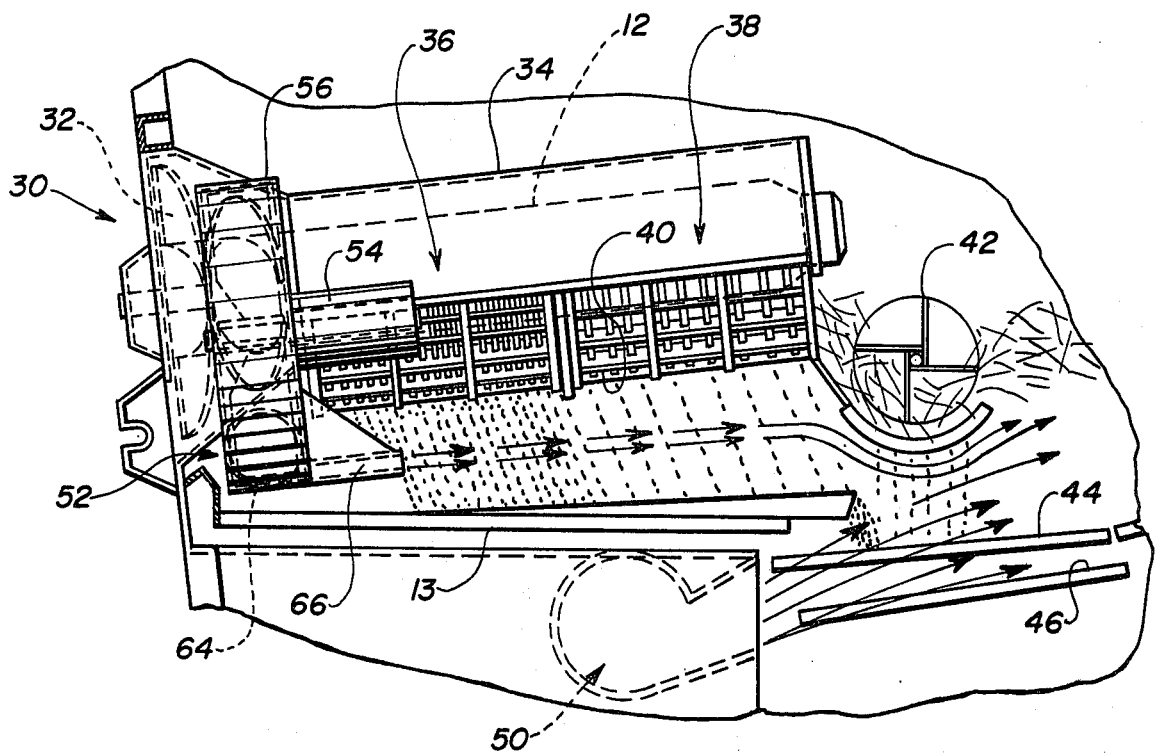
FIG. 3 is an enlarged partial cross-sectional side elevational view illustrating an embodiment of the present invention.
Figure 4:
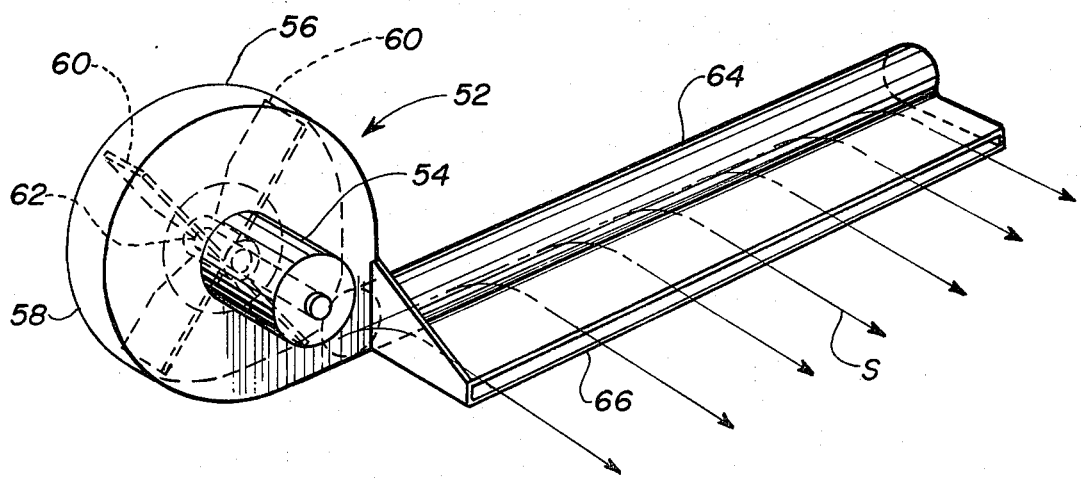
FIG. 4 is a perspective view illustrating an embodiment of the present invention.

The present invention contemplates the addition of means such as another fan 52 also for cleaning the grain by providing substantially a flat sheet of air forced to move through crop material after that crop material leaves the rotors 12 but before that crop material reaches the grain pan 13, see FIGS. 3 and 4. Fan 52 is mounted in harvester 10 adjacent infeed portion 30 between rotor 12 and grain pan 13 and comprises a commercially available electric motor 54 appropriately electrically connected to an electrical system aboard harvester 10. Motor 54 is preferably a four horsepower electric motor model number PB-8 manufactured by Cincinnati Blower. Motor 54 is connected to a housing 56 which is preferably formed of commercially available sheet metal. Housing 56 includes a first cylindrical portion 58 having therein a plurality of blower blades 60 connected to a hub 62 and connected to be rotated at about 3500 rpm by motor 54. A stream of air produced by blower blades 60 is forced into a plenum portion 64 of housing 56. An elongated, substantially flat rectangular spout portion 66 of housing 56 is attached to plenum 64 for receiving air from the blower and transforming and discharging forced air in an elongated substantially flat sheet as indicated by arrows designated S. As a result, a substantially elongated flat sheet of forced air is directed through crop material after the material leaves rotors 12 but before that material lands on grain pan 13. It is preferred that fan 52 is capable of moving the sheet of air at from about 4000 feet per minute in the vicinity of the forward end 7 of grain pan 13 to about 400 feet per minute in the vicinity of the aft end 9 of grain pan 13. Under some circumstances, it may be preferable to drive fan 52 by a variable speed belt drive connected to the inherent drive system of the associated combine.

It is anticipated that housing 56 may be located remotely from plenum 64 so that clean air produced in housing 56 can be transported to plenum 64 by a conduit or the like.

With the parts assembled as set forth above crop material enters infeed portion 30 and is moved by augers 32 into tubes 34. Threshed and separated material falls downwardly through grates 40 toward grain pan 13 and then to sieves 44,46. A conventional fan 50 removes chaff and the like as crop material moves from grain pan 13 to sieves 44,46. Also, an additional fan 52 removes chaff and the like as crop material moves from rotors 12 toward grain pan 13.

The foregoing has described a combine harvester including a plurality of cleaning fans. One of the fans is provided to aid in cleaning crop material before that crop material enters the grain pan.

It is anticipated that aspects of the present invention, other than those specifically defined in the appended claims, can be obtained from the foregoing description and the drawings.

Having thus described the invention, what is claimed is:

1. A harvester comprising:
   rotary means in the harvester for threshing and separating crop material, said rotary means having an infeed portion;
   means connected to the harvester for feeding crop material to the infeed portion;
   a grain pan operably connected for receiving crop material from said rotary means and transporting the crop material received thereon, said grain pan being spaced below said rotary means;
   means for cleaning grain moving from said rotary means to said grain pan, said means for cleaning including a first fan mounted in a housing, said housing including a plenum portion and a substantially flat, elongated spout for moving a substantially flat sheet of forced air between said rotary means and said grain pan, said first fan being operable to clean crop material before being received on said grain pan;
   a sieve operably connected for receiving crop material from said grain pan, said sieve being spaced from said grain pan; and,
   further means for cleaning grain moving from said grain pan to said sieve, said further means including a second fan for moving air between said transport means and said sieve.

2. In a harvesting apparatus of the type having a rotary threshing and separating member, a header connected to gather crop material, a crop elevator for moving the crop material to an infeed portion of the rotary member, a grain pan operably connected to receive threshed grain from the rotary member and to convey threshed grain received thereon, a sieve positioned for receiving the threshed grain from the grain pan, and a first fan for forcing air through grain moving from the grain pan to the sieve for removing chaff from the grain, the improvement comprising:
   means for cleaning the grain moving from said rotary means to said grain pan, said means for cleaning including a second fan connected adjacent said infeed portion and being of a construction sufficient for moving an elongated, substantially flat sheet of forced air between said rotary member and said grain pan.

3. The harvester of claim 1 wherein said plenum portion is positioned and constructed to blow a generally horizontal curtain of air to clean crop material as said crop material is falling between said rotary means and said grain pan.

4. The harvester of claim 3 wherein said second fan is mounted adjacent said infeed portion and positioned to blow said curtain of air rearwardly for discharge from the harvester.

5. The harvesting apparatus of claim 2 wherein said second fan is mounted in a housing having a plenum portion and a substantially flat, elongated spout for creating a substantially flat sheet of forced air.

6. The harvesting apparatus of claim 5 wherein said plenum portion is positioned to blow said substantially flat sheet of air generally horizontally and rearwardly for discharge from the harvesting apparatus.

* * * * *